(12) United States Patent
Martch

(10) Patent No.: US 12,328,467 B2
(45) Date of Patent: *Jun. 10, 2025

(54) TELEVISION RECEIVER WIRELESS CREDENTIAL PORTING

(71) Applicant: DISH Network L.L.C., Englewood, CO (US)

(72) Inventor: Henry Gregg Martch, Parker, CO (US)

(73) Assignee: DISH Network L.L.C., Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/595,570

(22) Filed: Mar. 5, 2024

(65) Prior Publication Data

US 2024/0251122 A1 Jul. 25, 2024

Related U.S. Application Data

(63) Continuation of application No. 17/700,662, filed on Mar. 22, 2022, now Pat. No. 11,962,831.

(51) Int. Cl.
| | |
|---|---|
| *H04N 21/422* | (2011.01) |
| *H04N 21/426* | (2011.01) |
| *H04W 12/06* | (2021.01) |
| *H04W 12/50* | (2021.01) |
| *H04W 76/10* | (2018.01) |
| *H04W 84/18* | (2009.01) |

(52) U.S. Cl.
CPC ... *H04N 21/42206* (2013.01); *H04N 21/4263* (2013.01); *H04W 12/06* (2013.01); *H04W 12/50* (2021.01); *H04W 76/10* (2018.02); *H04W 84/18* (2013.01)

(58) Field of Classification Search
CPC ........ H04N 21/42206; H04N 21/4263; H04W 76/10; H04W 12/50; H04W 12/06; H04W 84/18
See application file for complete search history.

(56) References Cited

U.S. PATENT DOCUMENTS

| | | | |
|---|---|---|---|
| 2016/0125733 A1* | 5/2016 | Sallas | G08C 17/02 398/106 |
| 2019/0200070 A1* | 6/2019 | Raikar | H04N 21/43615 |
| 2023/0075274 A1* | 3/2023 | Kamath | H04W 12/06 |

* cited by examiner

*Primary Examiner* — Yassin Alata
(74) *Attorney, Agent, or Firm* — Kilpatrick Townsend & Stockton LLP

(57) ABSTRACT

Various arrangements for porting wireless network credentials, such as between television receivers, are presented herein. A remote control may be paired with a first television receiver, such as a host television receiver. Wireless network credentials may be provided to and stored by the paired remote control. The remote control can then be paired with a second television receiver, such as a client television receiver. The second television receiver can then receive the stored wireless network credentials from the remote control. The second television receiver can then connect with a wireless network using the received wireless network credentials, such as to communicate with the host television receiver or access the Internet.

20 Claims, 5 Drawing Sheets

TELEVISION RECEIVER WIRELESS CREDENTIAL PORTING

CROSS REFERENCE TO RELATED APPLICATIONS

This application is a continuation of U.S. Non-Provisional patent application Ser. No. 17/700,662, filed on Mar. 22, 2022, which is incorporated by reference for all purposes.

BACKGROUND

Initial setup of equipment that communicates using a wireless network can be frustrating. For example, a host television receiver may be wired to an outdoor antenna to receive television channels. The host television receiver may use a wireless network to stream a received television channel to a remote client television receiver located elsewhere within a home. Credentials for the wireless network may need to be provided to the host television receiver, the client television receiver, or both in order for access to the wireless network to be granted. Such situations, where potentially complicated passwords and wireless network identifiers need to be provided, can be especially frustrating when a physical keyboard is not available for manual entry, such as with headless television receivers. Further, such complicated passwords and network identifiers lend themselves to being entered incorrectly. Embodiments detailed herein help to expedite and ease distribution of wireless credentials to unconfigured television receivers.

SUMMARY

Various embodiments are described related to a system for porting wireless network credentials. In some embodiments, a system for porting wireless network credentials is described. The system may comprise a remote control. The system may comprise a host television receiver. The host television receiver may comprise a plurality of tuners for receiving television channels. The host television receiver may comprise a network interface. The host television receiver may comprise a first remote control interface. The host television receiver may comprise a first processing system, in communication with the plurality of tuners, the network interface, and the first remote control interface. The first processing system may be configured to receive, from the first remote control interface, a first pairing request. The first processing system may be configured to, in response to the first pairing request, transmit wireless network credentials to the remote control via the first remote control interface. The system may comprise a client television receiver. The client television receiver may comprise a wireless network interface. The client television receiver may comprise a second remote control interface. The client television receiver may comprise a second processing system, in communication with the wireless network interface and the second remote control interface. The second processing system may be configured to receive, from the second remote control interface, a second pairing request. The second processing system may be configured to, in response to the second pairing request, receive the wireless network credentials from the remote control via the first remote control interface. The second processing system may be configured to communicate with the wireless network interface using the wireless network credentials.

Embodiments of such a system may include one or more of the following features: the second processing system may be further configured to pair the remote control in response to the pairing request to enable the remote control to control the client television receiver. The remote control may comprise a third processing system that may be configured to receive the wireless network credentials from the host television receiver, store the wireless network credentials using a non-transitory processor-readable medium of the remote control, and transmit the wireless network credentials to the client television receiver. The remote control may comprise an RF communication interface that may communicate with the first remote control interface and the second remote control interface. The wireless network credentials may comprise a service set identifier (SSID) and a password. The second processing system being configured to communicate with the wireless network using the wireless network credentials may comprise receiving a stream of a television channel from the host television receiver via the wireless network interface. The second processing system being configured to communicate with the wireless network using the wireless network credentials may comprise transmitting a channel change command to the host television receiver via the wireless network interface. The system may further comprise a wireless television service router. The wireless television service router may host a wireless network using the wireless network credentials. The second remote control interface may comprise a near-field communication (NFC) interface. The system may further comprise a second client television receiver. The system may further comprise a third wireless network interface. The system may further comprise a third remote control interface. The system may further comprise a third processing system, in communication with the third wireless network interface and the third remote control interface. The third processing system may be configured to receive, from the third remote control interface, a temporary pairing request. The third processing system may be configured to, in response to the temporary pairing request, receive the wireless network credentials from the remote control via the third remote control interface. The third processing system may be configured to communicate with the host television receiver via the third wireless network interface using the wireless network credentials.

In some embodiments, a method for porting wireless network credentials is described. The method may comprise obtaining, by a first television receiver, wireless network credentials. The method may comprise pairing, by the first television receiver, a remote control. The method may comprise providing, by the first television receiver, wireless network credentials to the paired remote control. The method may comprise pairing, by a second television receiver, the remote control. The method may comprise receiving, by the second television receiver from the remote control, the wireless network credentials. The method may comprise connecting, by the second television receiver, with a wireless network using the received wireless network credentials.

Embodiments of such a method may include one or more of the following features: receiving, by the second television receiver, a stream of a television channel from the first television receiver via the wireless network. The method may further comprise transmitting, by the second television receiver, a request for the television channel to the first television receiver via the wireless network. The method may comprise receiving, by the remote control, the wireless network credentials from the first television receiver. The method may comprise storing, by the remote control, the wireless network credentials using a non-transitory processor-readable medium. The method may comprise transmitting, by the remote control, the wireless network credentials to the second television receiver. An RF interface may be used to receive and transmit the wireless network credentials by the remote control. The wireless network credentials may comprise a service set identifier (SSID) and a password. Pairing between the first television receiver and the remote control may be a temporary pairing such that the remote control may not be enabled to control functionality of the first television receiver. Pairing between the second television receiver and the remote control may be such that the remote control may be enabled to control functionality of the second television receiver.

In some embodiments, a system for porting wireless network credentials is described. The system may comprise a porting device. The system may comprise a first electronic device. The device may comprise a network interface. The device may comprise a first communication interface. The device may comprise a first processing system, in communication with the network interface, and the first communication interface. The system may be configured to receive a first pairing request for the porting device. The system may be configured to, in response to the first pairing request, transmit wireless network credentials to the porting device via the first communication interface. The system may comprise a second electronic device. The device may comprise a wireless network interface. The device may comprise a second communication interface. The device may comprise a second processing system, in communication with the wireless network interface and the second communication interface. The second processing system may be configured to receive a second pairing request. The system may be configured to, in response to the second pairing request, receive the wireless network credentials from the porting device via the first communication interface. The system may be configured to communicate with the wireless network interface using the wireless network credentials. The porting device may be a remote control.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

In a home or business at which multiple television receivers are to be installed, it may be convenient to install at least some of the television receivers without wires, such as if there is no preexisting wiring installed for interconnecting devices. Rather, a host television receiver may installed and connected to an antenna or other signal source via a wire, such as coaxial cable. The host television receiver may provide content services to one or more other client television receivers located throughout the structure. Content, such as a stream of a television channel, may be sent to the client television receiver wirelessly, such as by using a wireless network created by a wireless router external to the host television receiver or integrated with the host television receiver.

In order for the host television receiver, the client television receiver, or both to communicate wirelessly using the wireless network, both devices require accurate wireless network credentials for the wireless network. In embodiments detailed herein, rather than, for example, requiring a user to manually input wireless network credentials, a television remote control can serve to port wireless network credentials between television receivers. Via a pairing process, the television remote control can acquire wireless network credentials from a first television receiver and port to a second television receiver. The television remote control can then remain paired with the second television receiver in order to control the selection television receiver and associated components (e.g., channel change commands, power on/off, audio volume, etc.).

Figure 1:
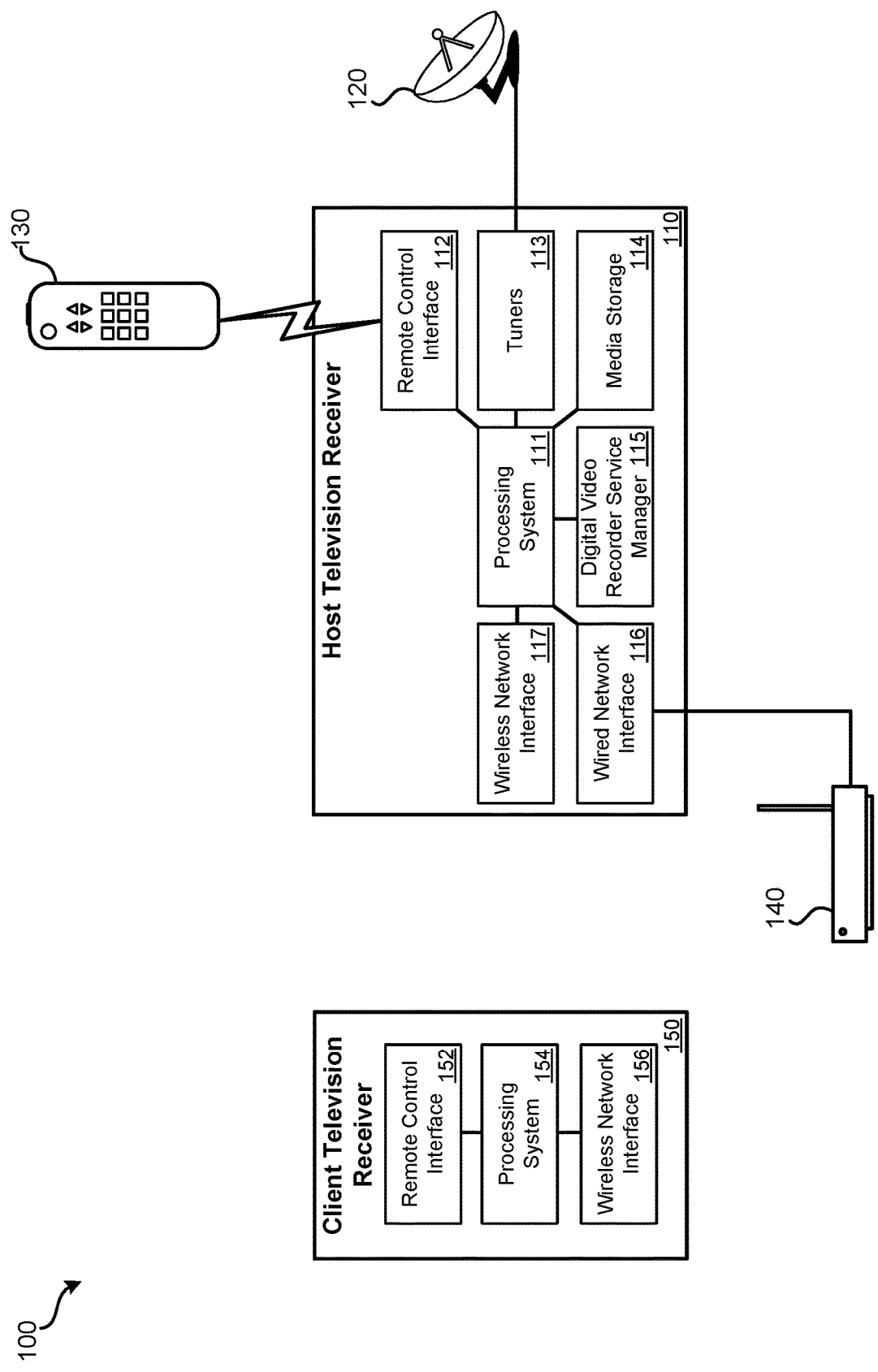
FIG. 1 illustrates an embodiment of a television receiver system for porting wireless network credentials.

Further detail regarding these and other embodiments are provided in relation to the figures. FIG. 1 illustrates an embodiment of a television receiver system 100 ("system 100") for porting wireless network credentials. System 100 involves porting wireless network credentials from one television receiver to another. System 100 includes: host television receiver 110; antenna 120; remote control 130; wireless network router 140 ("router 140"); and client television receiver 150. In this example, client television receiver 150 requires wireless network credentials in order to be able to use a wireless network created by router 140. Host television receiver 110 and client television receiver 150 can be headless devices, meaning no physical user interface is present to directly provide user input to the receivers.

Host television receiver 110 can include: processing system 111; remote control interface 112; tuners 113; media storage 114; digital video recorder (DVR) service manager 115; wired network interface 116; and wireless network interface 117. Client television receiver 150 can include: remote control interface 152; processing system 154; and wireless network interface 156. In general, client television receiver 150 can be understood to be a "thin client" that has a reduced feature sent from host television receiver 110 and thus relies on services to be provided by host television receiver 110. For example, client television receiver 150 is not connected with antenna 120 and does not have tuners; therefore, client television receiver 150 relies on host television receiver 110 to transmit television channel streams to client television receiver 150 via a wireless network. Further, other services that can be accessed via client television receiver 150 may be hosted by host television receiver 110, such as DVR services, or such as the recording of content. No content may be recorded or stored locally by client television receiver 150; rather, stored or recorded content may be stored using media storage 114 and can be streamed to client television receiver 150 via the wireless network hosted by router 140.

In some embodiments, the functionality of router 140 is incorporated as part of host television receiver 110. In other embodiments, router 140 is external to host television receiver 110. A connection between router 140 and host television receiver 110 may be a wired (e.g., ethernet) connection that uses wired network interface 116. Alternatively, a connection may be present wirelessly via wireless network interface 117. If a connection is made via wired network interface 116, host television receiver 110 may be able to request and/or otherwise retrieve wireless network credentials (e.g., SSID and password) from router 140. If router 140 is incorporated as part of host television receiver 110, processing system 111 may have access to storage on which the wireless network credentials are stored. If wireless network interface 117 is used to communicate with router 140, a user may need to manually enter (e.g., via an on-screen keyboard) the SSID and/or password for router 140.

Router 140 can host a wireless network that allows for multiple devices to communicate locally and, possibly, with the Internet. For example, the wireless network may be Wi-Fi or based on some other IEEE 802.11 wireless networking standard. For example, 802.11ac may be used; other protocols include: IEEE 802.11b, 802.11g, 802.11n, 802.11ad, 802.11af, etc. In other embodiments, other protocols may be used that also use some form of wireless network credentials, such as a network identifier (e.g., SSID) and password or passcode.

Processing system 111 may serve to coordinate commands received from client television receiver 150, communication with remote control 130, reception of content via tuners 113, and DVR services performed using DVR service manager 115. Processing system 310 may include one or more special-purpose or general-purpose processors. Such special-purpose processors may include processors that are specifically designed to perform the functions of the components detailed herein. Such special-purpose processors may be ASICs or FPGAs which are general-purpose components that are physically and electrically configured to perform the functions detailed herein. Such general-purpose processors may execute special-purpose software that is stored using one or more non-transitory processor-readable mediums, such as random access memory (RAM), flash memory, a hard disk drive (HDD), or a solid state drive (SSD). Processing system 111 can execute the functionality of other components that can be performed using software, such as DVR service manager 115.

In the illustrated embodiment of system 100, host television receiver 110 receives television channels and, possibly, other content via antenna 120. Antenna 120 can be a dish antenna that receives television channels from one or more satellites. Via a wired connection (e.g., coaxial cable), antenna 120 is connected with host television receiver 110, with tuners 113 being used to receive the television channel. If the television channel was requested for output by client television receiver 150, a stream of the television channel can be transmitted to client television receiver 150 via a wireless network created by router 140. However, before such communication, both host television receiver 110 and client television receiver 150 need to have wireless network credentials to communicate via router 140.

As detailed previously, host television receiver 110 may have the wireless network credentials stored locally, such as by using a non-transitory processor-readable medium or can access the wireless network credentials from router 140, such as via wired network interface 116. Remote control 130, which may have a primary purpose of serving as a user interface for either client television receiver 150 or host television receiver 110, can provide the additional function of porting wireless network credentials between devices, such as between host television receiver 110 and client television receiver 150.

A pairing process can be initiated between remote control 130 and host television receiver 110. This pairing process can be initiated on remote control 130 (e.g., by holding down a particular button) and by entering host television receiver 110 into a particular mode (e.g., by navigating through menus to select a remote pairing function). In some embodiments, multiple pairing processes might be available. A temporary pairing that is performed in response to a temporary pairing request may only result in a transfer of parameters, such as wireless network credentials, to remote control 130 from host television receiver 110 (and remote control 130 may not be enabled to control host television receiver 110). Alternatively, a pairing between remote control 130 and host television receiver 110 can result in a transfer of the parameters to remote control 130 and remote control 130 being enabled to control host television receiver 110.

Once the wireless network credentials have been loaded onto remote control 130, remote control 130 can be brought into proximity of client television receiver 150. Client television receiver 150 is within wireless communication range of router 140. Therefore, client television receiver 150 is typically within the same structure as host television receiver 110, but typically a different room.

Figure 2:
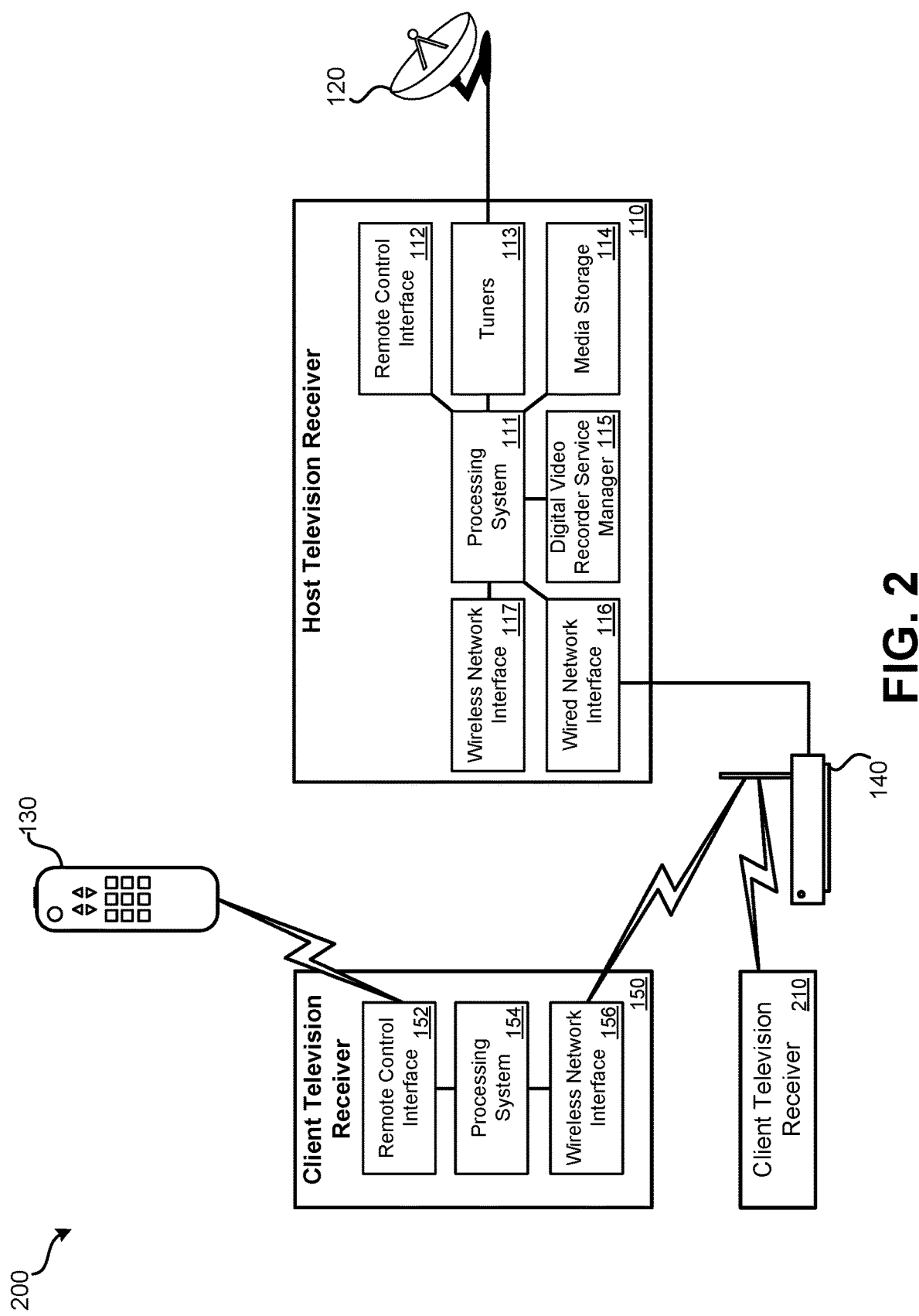
FIG. 2 illustrates another embodiment of a television receiver system for porting wireless network credentials.

FIG. 2 illustrates another embodiment of a television receiver system 200 ("system 200") for porting wireless network credentials. System 200 can represent system 100, with remote control 130 having been moved by a user into the proximity of client television receiver 150. A pairing process may be performed between client television receiver 150 and remote control 130 via remote control interface 152. In some embodiments, this pairing process can be initiated on remote control 130 (e.g., by holding down a particular button) and by entering client television receiver 150 into a particular mode (e.g., by navigating through menus to select a remote pairing function).

While pairing between remote control 130 and host television receiver 110 was for the purpose of obtaining wireless network credentials, remote control 130 may be paired longer term with client television receiver 150 such that remote control 130 can be used to control various functions of client television receiver 150. Therefore, when paired, remote control 130 may transmit the wireless network credentials to client television receiver 150 via remote control interface 152 and additionally remain paired such that remote control 130 can be used to control various functions of client television receiver, such as channel changes, power, audio volume, etc.

The wireless network credentials loaded onto client television receiver 150 from remote control 130 may be performed as part of the pairing process or may be performed in response to the user attempting to configure client television receiver 150 to communicate with host television receiver 110. For example, during the setup process, client television receiver 150 may output an interface for presentation to a television that indicates wireless network credentials are available for loading from remote control 130 and prompt the user to access the wireless network hosted by router 140. The wireless network credentials can be loaded by processing system 154 onto wireless network interface 156 and used to access the wireless network hosted by router 140.

Remote control 130 can then be used to perform a similar process at client television receiver 210 at some future time.

As long as the wireless network credentials have not been changed, the wireless network credentials stored by remote control 130 may remain valid. A user can repeat the pairing process between remote control 130 and client television receiver 210 in order to load the wireless network credentials onto client television receiver 210 for accessing the wireless network hosted by router 140. If multiple pairing processes are available, a temporary pairing process may be performed if remote control 130 is not to be used long-term with client television receiver 210. That is, a temporary pairing process may allow for the transmission of various parameters, such as including wireless network credentials, from remote control 130 to client television receiver 210, but remote control 130 may not be enabled to control functionality of client television receiver 210. Alternatively, a full pairing process may be performed which involves remote control 130 being paired to transfer parameters and control functionality of client television receiver 210.

Processing system 111 may serve to coordinate commands received from remote control 130 and transmit to host television receiver 110 via router 140. Processing system 111 may include one or more special-purpose or general-purpose processors. Such special-purpose processors may include processors that are specifically designed to perform the functions of the components detailed herein. Such special-purpose processors may be ASICs or FPGAs which are general-purpose components that are physically and electrically configured to perform the functions detailed herein. Such general-purpose processors may execute special-purpose software that is stored using one or more non-transitory processor-readable mediums, such as random access memory (RAM), flash memory, a hard disk drive (HDD), or a solid state drive (SSD).

Once the wireless network credentials have been successfully loaded onto client television receiver 150 from remote control 130, client television receiver 150 may begin communicating with host television receiver 110 via the wireless network hosted by router 140. A message may be presented to a user via a television connected with client television receiver 150 that indicates the wireless network credentials have successfully been loaded and client television receiver 150 can now properly communicate with host television receiver 110. This remote control-based version of porting wireless credentials from host television receiver 110 to client television receiver 150 does not involve a user having to manually enter (e.g., type on a physical or on-screen keyboard) either a password or SSID.

For example, a channel selection or channel change command may originate from user input to remote control 130, be transmitted by remote control 130 to client television receiver 150 via remote control interface 152, then be relayed by processing system 154 via wireless network interface 156 and the wireless network created by router 140 to host television receiver 110. Host television receiver 110 may tune a tuner of tuners 113 to the appropriate frequency and transmit a stream of the television channel via router 140 to client television receiver 150. Communication between host television receiver 110 and router 140 may be performed via either of wireless network interface 117 or wired network interface 116.

Various components of client television receiver 150 and host television receiver 110 are not shown for simplicity. For instance, interfaces to connect the television receivers with televisions are present, but not illustrated. The number of client television receivers and routers present can vary by embodiment. For instance, more than one or more than two client television receivers may be present. For larger numbers of client television receivers, multiple routers may be needed to provide sufficient bandwidth.

Figure 3:
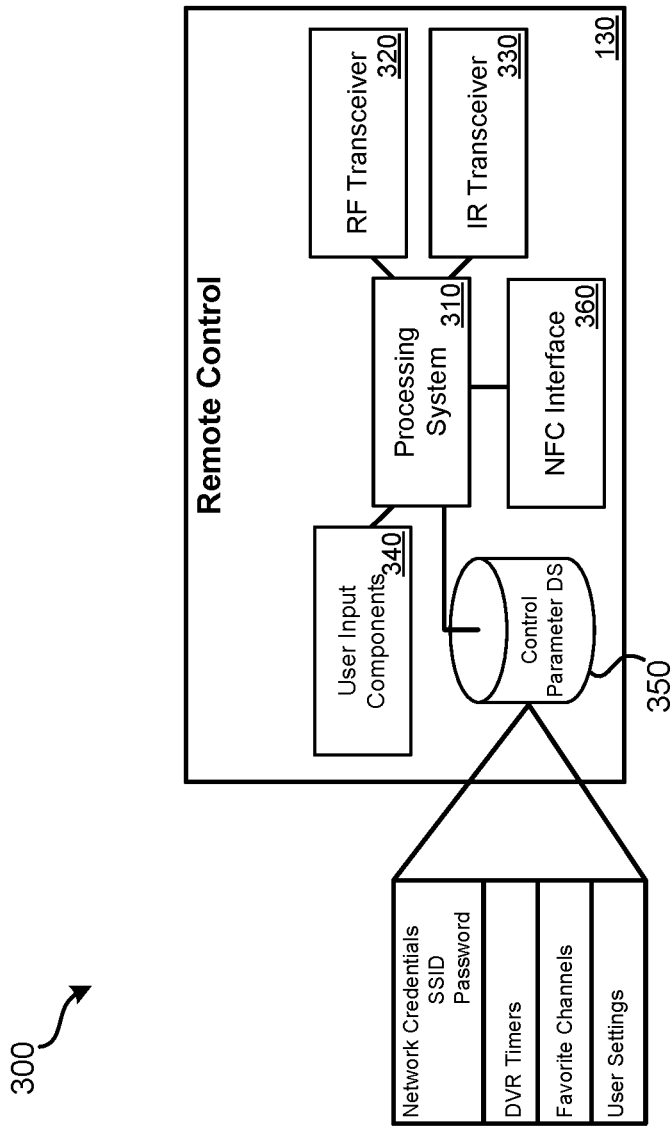
FIG. 3 illustrates an embodiment of a remote control for porting wireless network credentials.

FIG. 3 illustrates an embodiment 300 of remote control 130 that can perform porting of wireless network credentials. Remote control 130 can include: processing system 310; radio frequency (RF) transceiver 320; infrared transceiver 330; user input components 340; control parameter datastore 350; and NFC interface 360. User input components 340 may be various buttons, dials, a touchpad, rocker switches, etc. that allow a user to provide input to remote control 130.

RF transceiver 320 can allow for bi-directional communication with a remote control interface. RF can be used to send messages from remote control 130 and receive messages from television receivers. Additionally or alternatively, an infrared (IR) transmitter or transceiver may be present. In some embodiments, messages may only be sent using IR. In other embodiments, IR transceiver 330 may be present and can use IR to send and receive messages with remote control interfaces of television receivers. Processing system 310 may include one or more special-purpose or general-purpose processors. Such special-purpose processors may include processors that are specifically designed to perform the functions of the components detailed herein. Such special-purpose processors may be ASICs or FPGAs which are general-purpose components that are physically and electrically configured to perform the functions detailed herein. Such general-purpose processors may execute special-purpose software that is stored using one or more non-transitory processor-readable mediums.

Control parameter datastore 350, which is a non-transitory processor-readable medium, can be used to stores parameters received from a television receiver and which are to be ported to another television receiver. Control parameter datastore can store the wireless network credentials (e.g., SSID and password) received from the host television receiver. Other parameters may also be stored, such as DVR timers, favorite channels, and other user settings.

In some embodiments, NFC interface 360 is present. Rather than using RF transceiver 320 or IR transceiver 330 to receive control parameters, NFC interface 360 may be used to obtain parameters and transmit parameters to other devices. For example, when remote control 130 is placed in near proximity to an NFC interface of a router or host television receiver, wireless network credentials may be acquired and stored using control parameter datastore 350. When NFC interface 360 is placed in near proximity to an NFC interface of a client television receiver, the wireless network credentials may be retrieved from control parameter datastore 350 and transmitted to the client television receiver.

Figure 4:
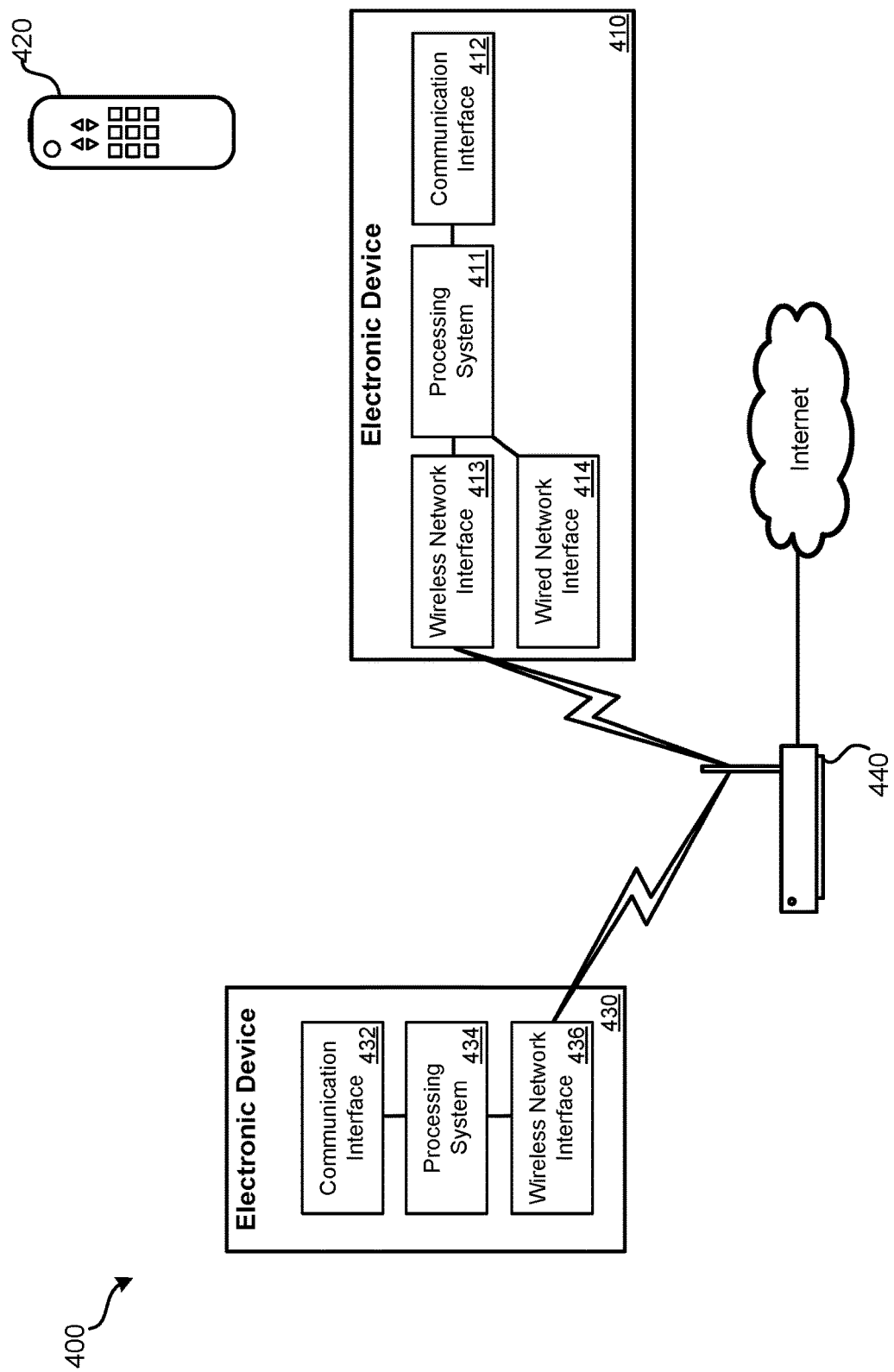
FIG. 4 illustrates an embodiment of a system for porting wireless network credentials.

While embodiments detailed herein are focused on television receivers, it should be understood that using a remote control to physically port wireless network credentials can be applied to other types of devices. FIG. 4 illustrates an embodiment of a system 400 for porting wireless network credentials between devices other than television receivers. System 400 can include: electronic device 410; remote control 420; electronic device 430; and router 440. Electronic device 410 includes: processing system 411; communication interface 412; wireless network interface 413; and wired network interface 414. Electronic device 430 may include: processing system 434; remote control interface 432; and wireless network interface 436. In general, the components of electronic device 410 and electronic device 430 can function similarly to the counterpart components of system 100 and system 200. Electronic device 410 and electronic device 430 may be smart home devices (e.g., smart outlets, smart switches, smart smoke detectors, smart thermostats, smart home assistant devices), sensors, computers, or any other electronic devices which use a wireless network to communicate (e.g., access the Internet). Communication interfaces 412 and 432, in addition to possibly being RF- or IR-based, can be Bluetooth®, NFC, or some other device-to-device short-range communication protocol.

As with the television receiver arrangements, remote control 420 can receive wireless network credentials from electronic device 410, such as via communication interface 412. Alternatively, as detailed in relation to FIG. 3, electronic device 410 may have an NFC interface through which wireless network credentials may be loaded and stored onto remote control 420. The wireless network credentials on electronic device 410 may have been obtained directly from router 440 via wired network interface 414 or possibly manually entered by a user such that wireless network interface 413 can be used to wirelessly communicate with router 440. In some embodiments, electronic device 410 and router 440 are part of the same device.

In some embodiments, remote control 420 may take a different form. For example, rather than using a television remote control, a dedicated device used for porting wireless network credentials may be used. Other forms of electronic devices, referred to generally as a porting device, that can receive, transmit and store wireless network credentials are also possible, such as smartphones, gaming devices, tablet computers, etc. For embodiments that do not use a remote control, rather than communication interfaces 412 and 432 being present, some other form of wireless communication may be used, such as a Bluetooth® communication interface or NFC interface.

Figure 5:
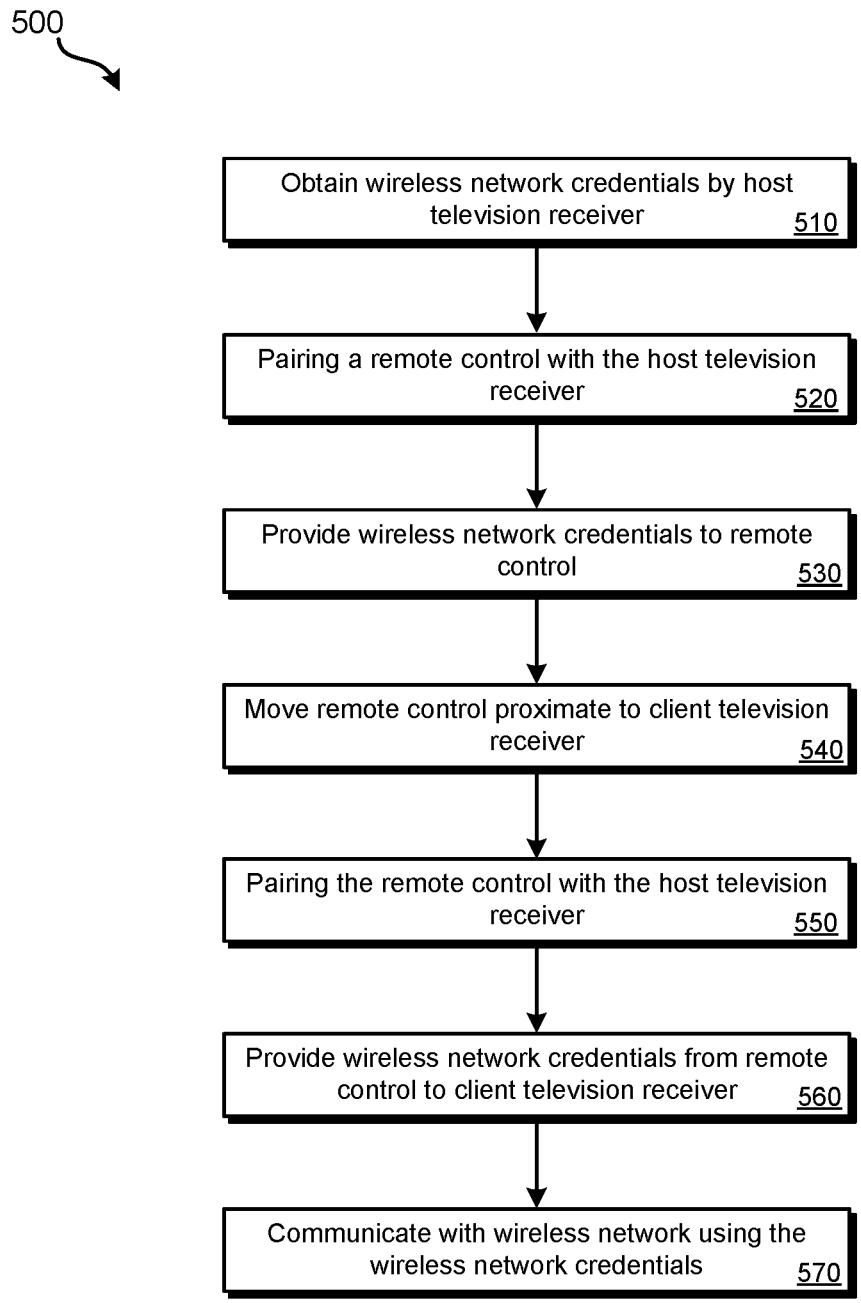
FIG. 5 illustrates an embodiment of a method for porting wireless network credentials.

The systems and devices of FIGS. 1-4 can be used to perform various methods. FIG. 5 illustrates an embodiment of a method 500 for porting wireless network credentials. The detailed embodiment of method 500 is focused on the example of television receivers; however, this arrangement can be applied to other forms of devices as detailed in relation to FIG. 4. Method 500 may be performed using system 100, system 200, the remote control of embodiment 300, and/or system 400.

At block 510, wireless network credentials may be obtained by a host television receiver. The wireless network credentials may be obtained from a user manually providing them to the host television receiver, such as using an on-screen interface presented via a television. In some embodiments, if a wired connection is present between the host television receiver and the router or the router is incorporated as part of the host television receiver, the wireless network credentials may be available for retrieval by the host television receiver without user input.

At block 520, pairing can be performed between the host television receiver and a remote control. A pairing request may be received from the remote control. Additionally or alternatively, the pairing request may be initiated at the host television receiver. In some embodiments, to successfully pair a remote control with the television receiver, both devices need to be placed into a pairing mode. In some embodiments, the pairing request of block 520 may be a temporary pairing request. A temporary pairing request may only pair the two devices such that parameters, such as wireless network credentials, can be transmitted to the remote control, but the remote control cannot be used to control the host television receiver in the future. Alternatively, a full pairing request may pair the two devices such that both parameters can be transmitted to the remote control and the remote control can be used to control the host television receiver in the future.

At block 530, the wireless network credentials, which can include an SSID and password, are transmitted to the remote control, such as via a remote control interface (e.g., an RF or IR based remote control interface). The wireless network credentials may be stored by the remote control. Block 530 may be performed in response to the pairing of block 520 being successfully completed and wireless network credentials being stored by the host television receiver. In some embodiments, the wireless network credentials are only transmitted to the remote control if the host television receiver has successfully used the wireless network credentials to access the wireless network. For example, even if the host television receiver uses a wired connection with the router for communication, the host television receiver can use a separate wireless interface to test the wireless credentials.

At block 540, a user may physically move the remote control that now has the stored wireless network credentials from being proximate to the host television receiver to being proximate to the client television receiver that needs wireless credentials.

At block 550, pairing may be performed between the client television receiver and the remote control. A pairing request may be received by the client television receiver from the remote control. Additionally or alternatively, the pairing request may be initiated at the client television receiver. In some embodiments, to successfully pair the remote control with the client television receiver, both devices need to be placed into a pairing mode. Again here, a temporary pairing request may only pair the two devices such that parameters, such as wireless network credentials, can be transmitted to the remote control, but the remote control cannot be used to control the host television receiver in the future. Alternatively, a full pairing request may pair the two devices such that both parameters can be transmitted to the remote control and the remote control can be used to control the host television receiver in the future. If the remote control is planned to be used to control the client television receiver in the future, the remote control may be fully paired with the client television receiver to allow a user to interact with the television receiver in the future.

At block 560, the wireless network credentials are transferred from the remote control to the client television receiver. In some embodiments, block 560 is contingent on several conditions existing: 1) the client television receiver does not have valid wireless network credentials; 2) wireless network credentials are present on the remote control; and/or 3) the user has given permission (e.g., via the remote control or directly to the client television receiver) for the transfer of the wireless network credentials to be performed. Once received, the client television receiver may connect with the wireless network and confirm that the wireless credentials are valid.

At block 570, the wireless credentials are used to connect and communicate with the wireless network by the client television receiver. This communication can involve the client television receiver using the wireless network to access the Internet and/or communicate with the host television receiver. For example, the wireless network may be used to send commands from the client television receiver to the post television receiver and also may be used to receive streams of content, such as streams of television channels from the host television receiver.

After the wireless network credentials have successfully been ported from the host television receiver to the client television receiver, the wireless network credentials may be deleted from the remote control. Alternatively, the wireless network credentials may be stored such that if a future television receiver (or other type of electronic device) needs the wireless credentials, a future pairing process can be performed to provide the wireless network credentials to the device in need.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known processes, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A system for porting wireless network credentials, the system comprising:
    a client television receiver, comprising:
        a wireless network interface;
        a remote control interface; and
        a processing system, in communication with the wireless network interface and the remote control interface, wherein the processing system is configured to:
        receive, via the remote control interface from a remote control, a pairing request, wherein:
            in response to the pairing request, the remote control is: 1) enabled to provide channel change commands to the client television receiver; and 2) configured to provide the wireless network credentials to the client television receiver via the remote control interface; and
        communicate with a wireless network via the wireless network interface using the wireless network credentials provided by the remote control.

2. The system for porting wireless network credentials of claim 1, further comprising:
    a host television receiver, comprising:
        a plurality of tuners for receiving television channels;
        a second wireless network interface;
        a second remote control interface; and
        a second processing system, in communication with the plurality of tuners, the second wireless network interface, and the second remote control interface, wherein the second processing system is configured to:
        receive, from via the second remote control interface, a second pairing request; and
        transfer the wireless network credentials to the remote control via the second remote control interface.

3. The system for porting wireless network credentials of claim 2, further comprising the remote control.

4. The system for porting wireless network credentials of claim 3, wherein the remote control comprises a third processing system that is configured to receive the wireless network credentials from the host television receiver, store the wireless network credentials using a non-transitory processor-readable medium of the remote control, and transmit the wireless network credentials to the client television receiver.

5. The system for porting wireless network credentials of claim 4, wherein the remote control comprises an RF communication interface that communicates with the remote control interface and the second remote control interface.

6. The system for porting wireless network credentials of claim 1, wherein the wireless network credentials comprise a service set identifier (SSID) and a password.

7. The system for porting wireless network credentials of claim 1, wherein the processing system being configured to communicate with the wireless network using the wireless network credentials comprises receiving a stream of a television channel from a host television receiver via the wireless network.

8. The system for porting wireless network credentials of claim 7, wherein the processing system being configured to communicate with the wireless network using the wireless network credentials comprises transmitting a channel change command to the host television receiver via the wireless network.

9. The system for porting wireless network credentials of claim 1, the system further comprising a wireless television service router, wherein the wireless television service router hosts the wireless network using the wireless network credentials.

10. The system for porting wireless network credentials of claim 1, further comprising:
    a second client television receiver, comprising:
        a third wireless network interface;
        a third remote control interface;
        a third processing system, in communication with the third wireless network interface and the third remote control interface, wherein the third processing system is configured to:
        receive, from the third remote control interface, a temporary pairing request;

in response to the temporary pairing request, receive the wireless network credentials from the remote control via the third remote control interface; and communicate with a host television receiver via the third wireless network interface using the wireless network credentials.

11. A method for porting wireless network credentials, the method comprising:

pairing, by a television receiver, with a remote control;

in response to the pairing: 1) receiving, by the television receiver from the remote control, wireless network credentials for a wireless network, and 2) enabling, by the television receiver, the remote control to provide channel change commands to the television receiver; and connecting, by the television receiver, with the wireless network using the received wireless network credentials from the remote control.

12. The method for porting wireless network credentials of claim 11, further comprising:

obtaining, by a second television receiver via user input, wireless network credentials;

pairing, by the second television receiver, with the remote control;

providing, by the second television receiver, wireless network credentials to the paired remote control; and storing, by the remote control, the wireless network credentials.

13. The method for porting wireless network credentials of claim 12, further comprising:

receiving, by the television receiver from the second television receiver via the wireless network, a stream of a television channel.

14. The method for porting wireless network credentials of claim 13, further comprising:

transmitting, by the television receiver, a request for the television channel to the second television receiver via the wireless network.

15. The method for porting wireless network credentials of claim 11, further comprising:

receiving, by the remote control, the wireless network credentials from a second television receiver;

storing, by the remote control, the wireless network credentials using a non-transitory processor-readable medium; and transmitting, by the remote control, the wireless network credentials to the television receiver.

16. The method for porting wireless network credentials of claim 15, wherein an RF interface is used to receive and transmit the wireless network credentials by the remote control.

17. The method for porting wireless network credentials of claim 11, wherein the wireless network credentials comprise a service set identifier (SSID) and a password.

18. The method for porting wireless network credentials of claim 12, wherein pairing between the second television receiver and the remote control is a temporary pairing such that the remote control is not enabled to control functionality of the television receiver.

19. The method for porting wireless network credentials of claim 18, wherein pairing between the television receiver and the remote control is such that the remote control is enabled to control functionality of the television receiver.

20. A system for porting wireless network credentials, the system comprising:

a porting device;

an electronic device, comprising:
   a wireless network interface;
   a communication interface;
   a processing system, in communication with the wireless network interface and the communication interface, wherein the processing system is configured to:
      receive, via the communication interface, a pairing request from the porting device; and
      in response to the pairing request:
         (1) receive wireless network credentials via the communication interface to communicate with a wireless network via the wireless network interface using the wireless network credentials provided by the porting device, and
         (2) enable the porting device to provide channel change commands to the electronic device.

* * * * *